(12) United States Patent
Bartolucci et al.

(10) Patent No.: US 11,989,725 B2
(45) Date of Patent: May 21, 2024

(54) BLOCKCHAIN-IMPLEMENTED SYSTEMS AND METHODS FOR SECURE ACCESS CONTROL

(71) Applicant: nChain Licensing AG, Zug (CH)

(72) Inventors: Silvia Bartolucci, London (GB); Pauline Bernat, London (GB); Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 860 days.

(21) Appl. No.: 16/968,538

(22) PCT Filed: Feb. 1, 2019

(86) PCT No.: PCT/IB2019/050815
§ 371 (c)(1),
(2) Date: Aug. 7, 2020

(87) PCT Pub. No.: WO2019/155333
PCT Pub. Date: Aug. 15, 2019

(65) Prior Publication Data
US 2021/0042745 A1 Feb. 11, 2021

(30) Foreign Application Priority Data
Feb. 9, 2018 (GB) ..................... 1802148

(51) Int. Cl.
*G06Q 20/38* (2012.01)
*G06Q 20/06* (2012.01)
(Continued)

(52) U.S. Cl.
CPC ....... *G06Q 20/3825* (2013.01); *G06Q 20/065* (2013.01); *G06Q 20/401* (2013.01);
(Continued)

(58) Field of Classification Search
CPC ............. G06Q 20/3825; G06Q 20/065; G06Q 20/401; G06Q 2220/00; G06Q 20/389;
(Continued)

(56) References Cited

U.S. PATENT DOCUMENTS

2008/0247191 A1* 10/2008 Hsu ...................... G02B 3/0056
385/36
2016/0330034 A1 11/2016 Back et al.
(Continued)

FOREIGN PATENT DOCUMENTS

EP 3257191 A1 12/2017
WO 2015171580 A1 11/2015
(Continued)

OTHER PUBLICATIONS

Venkatakrishnan et al., "Dandelion: Redesigning the Bitcoin Network for Anonymity," Proceedings of the ACM on Measurement and Analysis of Computing Systems 1(1):1-34, Jun. 13, 2017.
(Continued)

*Primary Examiner* — Zeshan Qayyum
(74) *Attorney, Agent, or Firm* — Davis Wright Tremaine LLP

(57) ABSTRACT

The invention relates to a method of enabling conditional access to resource. The condition is the performance of a task. The task can be performed by one party or entity on behalf of another party or entity. The person, device or system controlling access to the resource creates a task that includes the broadcast of a transaction on the blockchain. In particular the transaction (part of the task) has a plurality of outputs, including a locking-output. Additional transactions or mechanism are created that enable access to the resource only when the task has been completed. Access to the resource is achieved by (i) the initial broadcast of the resource that makes it conditionally available and (ii) the
(Continued)

subsequent broadcast of the transaction, which fulfils or satisfies the condition that enables access to the resource. Multi-signatures and a refund mechanism are used by the parties to lock access to the resource. These multi-signatures are spread between the stages and transactions. The initial deposit broadcast makes the resource available, but access is prohibited because it is locked by a first multi-signature and allocated to a refund mechanism. The task, and transaction to be broadcast, are created wherein the transaction has a locking-output secured by a second multi-signature and also allocated to the refund mechanism. Access to the resource, however, requires both multi-signatures of the refund mechanism to have been signed and the broadcast of the main transaction.

13 Claims, 8 Drawing Sheets

(51) Int. Cl.
  *G06Q 20/40* (2012.01)
  *H04L 9/32* (2006.01)
  *H04L 9/00* (2022.01)
(52) U.S. Cl.
  CPC ....... *H04L 9/3247* (2013.01); *G06Q 2220/00* (2013.01); *H04L 9/50* (2022.05)
(58) Field of Classification Search
  CPC ....... H04L 9/3247; H04L 9/50; H04L 9/3239; H04L 9/14
  USPC .......................................................... 705/75
  See application file for complete search history.

(56) References Cited

U.S. PATENT DOCUMENTS

| | | | |
|---|---|---|---|
| 2017/0109735 A1* | 4/2017 | Sheng | G06Q 20/3678 |
| 2017/0154331 A1 | 6/2017 | Voorhees | |
| 2017/0221052 A1* | 8/2017 | Sheng | H04L 9/14 |
| 2017/0228727 A1* | 8/2017 | Forzley | G06Q 20/3823 |
| 2017/0317833 A1 | 11/2017 | Smith et al. | |
| 2018/0053161 A1 | 2/2018 | Bordash et al. | |
| 2018/0247191 A1* | 8/2018 | Katz | A63F 13/67 |
| 2018/0337904 A1* | 11/2018 | Letourneau | H04L 9/0866 |
| 2019/0205844 A1* | 7/2019 | Nuzzi | H04L 9/50 |

FOREIGN PATENT DOCUMENTS

| | | |
|---|---|---|
| WO | 2017190794 A1 | 11/2017 |
| WO | 2018006945 A1 | 1/2018 |
| WO | 2018020373 A1 | 2/2018 |
| WO | 2018020376 A1 | 2/2018 |
| WO | 2018020377 A1 | 2/2018 |

OTHER PUBLICATIONS

Dingledine et al., "Tor: The Second-Generation Onion Router", Jun. 2004, 18 pages.
Biryukov et al., "Deanonymisation of Clients in Bitcoin P2P Network", Cryptography and Security, Jul. 5, 2014, 15 pages.
Antonopoulos, "Mastering Bitcoin—Unlocking Digital Cryptocurrencies," O'Reilly Media, Inc., Dec. 20, 2014, 282 pages.
Bitcoin Wiki, "Atomic Cross-Chain Trading," retrieved May 31, 2018 from https://en.bitcoin.it/w/index.php?title=Atomic_swap &ol= , revision as of Jan. 28, 2018, 3 pages.
Bitcoin Wiki, "Contract," retrieved May 31, 2018 from https://en.bitcoin.it/w/index.php?title=Contract&oldid=63826, revision as of Aug. 10, 2017, 11 pages.
BT et al, "Is it Possible to Force a Person to Honor a Conditional Promise-to-pay?," https://bitcoin.stackexchange.com/questions/30607/is-it-possible-to-force-a-person-to-honor-a-conditional-promise-to-pay, Sep. 21, 2014, 1 page.
International Search Report and Written Opinion dated Apr. 25, 2019, Patent Application No. PCT/IB2019/050815, 14 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https:/bitcointalk.org/index.php?topic=741.0; prev_next=prev, 2 pages.
UK Commercial Search Report dated Jun. 1, 2018, Patent Application No. GB1802148.5 , 5 pages.
UK IPO Search Report dated Jul. 18, 2018, Patent Application No. GB1802148.5, 7 pages.

* cited by examiner

```
OP_IF
    OP_2 <P_A^1> <P_B^1> OP_2 OP_CHECKMULTISIG
OP_ELSE
    <expiry time T_1> OP_CHECKSEQUENCEVERIFY OP_DROP <P_A^1> OP_CHECKSIG
OP_ENDIF
```

Figure 9

BLOCKCHAIN-IMPLEMENTED SYSTEMS AND METHODS FOR SECURE ACCESS CONTROL

FIELD OF INVENTION

This specification relates generally to computer-implemented methods and systems suitable for implementation in a computer processor, such as a node of a blockchain network, or a group of such processors. Improved methods of providing a mechanism for secure and conditional access to a resource or output are described. The method and mechanism utilise the blockchain to increase the security and efficiency of a process in which performance-based access is offered. The invention is particularly suited, but not limited, to a collaboration between two or more participants, one of which can securely assign or delegate a task to the other in exchange for access to a resource via a plurality of collaboratively configured broadcasts.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to include all variations and versions of protocol or associated implementations which derive from the Bitcoin protocol. The term "user" may refer herein to a human or a processor-based resource. A blockchain is a peer-to-peer, electronic ledger which is implemented as a computer-based decentralised, distributed system made up of blocks which in turn are made up of transactions.

Each transaction is a data structure that encodes the transfer of control of a resource (which may be referred to as a "digital asset") between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be validated by the first node that receives the transaction—if the transaction is validated, the node relays it to the other nodes in the network; and ii) added to a new block built by a miner; and iii) mined, i.e. added to the public ledger of past transactions.

The use of pseudonyms in the Bitcoin cryptocurrency protocol is often thought of as being an enabler of anonymous transactions on the Blockchain, which can be considered secure because the user's details are not made public. However, research indicates that uncovering user identities within the Bitcoin network can be achieved and, therefore, security can be undermined. Indeed, a malicious adversary may try and succeed to link a public key to an interact protocol (IP) address being able to track all transactions submitted by a user. This could potentially lead to security vulnerabilities. Moreover, IP information may be used to retrieve the real user's identity as well by combining this information with other sources, e.g. internet forums and social media. Similarly, with the range of applications for a blockchain in general becoming increasingly diverse, all transactions on a blockchain can be vulnerable to interrogation. Thus security is a concern.

Information may be used to retrieve the real user's identity as well by combining this information with other sources, e.g. internet forums and social media. In such circumstances, generating multiple key public-private key pairs for different sets of transactions or participating in mixing services as expedients to increase the anonymity of the operations may not be successful [1].

De-anonymization attacks are typically carried out using a "super node", which connects to active Bitcoin nodes and monitors the transactions broadcast. The symmetric diffusion over the network allow for a 30% success rate in IP-public key linking [2]. The algorithms used mainly exploit peer-to-peer (P2P) graph structure and information about the diffusion. By tracking the Bitcoins' or other cryptocurrencies' flow or transactions in general and monitoring the public ledger, one may link multiple addresses generated by the same user.

This result can be achieved by analysing the transaction graph and clustering together addresses. Anonymous relay tools such as Tor [3] offer one of the strongest identity protection currently available, but still exhibit weaknesses and possible downsides. Indeed, relay systems may be vulnerable to traffic analysis, whereby the user's "first-hop" link to Tor and the "last-hop" link from Tor to the user's communication partner may be traced and used to correlate packets. Moreover, attack may cause denial of service as well as put the users' anonymity at risk.

In Biryukov et al. [2] authors present a method to de-anonymise P2P networks, by linking the users' pseudonyms with their IP addresses. This solution relies on the set of nodes a client connects to, which uniquely determine the client identity and the origin of the transaction.

OVERVIEW OF THE INVENTION

The invention provides a mechanism to inhibit discovery of a user's identify at the network layer i.e. at the level of the TCP/IP protocols, by allowing users to exchange their respective transactions before their diffusion on the network, thus blurring the link between the IP address of the transaction generated by a user and the user's address in the transaction.

The mechanism provides a secure and concise way for two participants to enter an arrangement or agreement where they both commit to perform an action each. The main transactions represents the actions, or the proof of an action taken by the participants. A refund or reward, and optional compensation scheme put in place in this mechanism incentivises each participant to honour their end of the commitment.

Furthermore, an agreement between two parties in which performance-based access to a resource is provided can be susceptible to interrogation and/or corruption. Either a third party, or even one of the parties, may be a malicious adversary and discover details about the agreement thus undermining the security expected of a blockchain.

The inventor has further realised that the exchange of transactions allows one party to offer another party conditional access to a resource in exchange for performing a task. A blockchain is not limited to cryptocurrency applications and can be used to securely manage access-controlled or confidential resources such as digital-rights, records systems, contracts and computing resources, for example. The invention provides a method that enables the secure delegation or transfer of such a task in a trust-less manner.

SUMMARY OF INVENTION

Overall, the invention resides in a novel approach for configuring a mechanism to securely permit performance-based access to a resource, which can be a non-financial resource, financial resource in the form of a cryptocurrency or a combination of both.

The inventive concept resides in control of access to a resource through logic-based actions. The access may be conditional upon a specified criteria being met. Security is established by a first party and second party generating multi-signature key for use in the transactions. Further, security is enhanced by access relying on a series of broadcasts. Finally, security vulnerabilities are overcome by at least one transaction being broadcast by another party.

Thus, in accordance with the present invention there is provided a method and system as defined in the appended claims.

Thus, it is desirable to provide a computer-implemented method for configuring secure access to a resource. This may be referred to as controlled access, task-based access and/or conditional access. Said access may be conditional upon a task being performed or a criteria being met and/or a triggering event being performed by a second party. The method may include: the task including broadcasting a transaction on a blockchain (network) in exchange for access to said resource, said resource being accessible via a blockchain and secured or locked by at least two private keys in a multi-signature address, and integrating a locking-output into the output of the transaction.

Said locking-output may be secured or locked by at least two private keys in a second multi-signature address. The method may comprise the step of creating a locking mechanism or refund mechanism having an output that requires both inputs, which include the resource and the locking-output, to be accessible via said blockchain, wherein the resource and the locking-output multi-signature addresses are signed before the locking mechanism is broadcast thus enabling the output of the resource and locking-output to an address accessible by the second party, wherein, upon broadcasting the transaction on the blockchain the locking-output is accessible and the subsequent broadcast of the locking mechanism allocates the resource and locking-output to the address accessible by the second party.

The method enables secure and conditional access to the resource and the locking output, because access to the resource is conditional upon the transaction being broadcast such that both inputs to the locking mechanism are available i.e. the condition is satisfied. In some embodiments, the invention resides in a computer-implemented, cryptographically-enforced method for configuring secure task-based access to a resource, said access being conditional upon a task being performed by a second party, wherein the task includes broadcasting a transaction on a blockchain in exchange for access to said resource.

The method includes a first party communicating and/or collaborating with a second party to create a first multi-signature address and second multi-signature address. Thereafter, the first party broadcasts a deposit mechanism that allocates a resource to the first multi-signature address. The first party builds a task or criteria (hereafter simply "task" for ease of reference), said task including the broadcast of a blockchain transaction (TX), and sends said task to the second-party for broadcast on the blockchain, said transaction having a locking-output allocated to the second multi-signature address, and optionally, a transaction output.

The method also includes the first party creating and sending a locking mechanism or refund mechanism to the second party, or receiving a locking mechanism from the second party, wherein the input to said locking mechanism is the resource and the locking-output, which are locked by their respective multi-signatures, and the output is the resource and the locking-output, wherein the first party signs the first multi-signature address and second multi-signature address, enabling the second party to sign the first multi-signature address and second multi-signature address, thus unlocking the input to the locking mechanism enabling the output to be allocated to an address accessible by the second party, wherein said output is conditional upon both the resource and the locking-output being allocated to their multi-signatures on the blockchain, and wherein upon confirmation of the transaction being broadcast, the locking mechanism is broadcast on the blockchain thus allocating the locking-output to the second multi-signature address and enabling the second party to access the resource and the locking-output.

The main transaction output is optional because, in the examples provided, it functions to assign an input from the first party to another address and is not essential to the operation of the locking mechanism. As described, the access to a resource is task/criteria/condition-based and the transactional output, when visible on the blockchain, can be used as an indicator that a task has been completed and/or the condition/criteria has been met. The transactional output can be used to improve security.

The locking-output, in conjunction with the locking mechanism, on the other hand, functions to lock (i.e. secure) the resource, which cannot be accessed until the task/broadcast of the transaction is done and both the resource and locking output satisfy the input conditions of the reward mechanism. This can be managed via the script of the locking mechanism.

The broadcast of the deposit mechanism can precede the broadcast of the transaction and/or locking mechanism. Either the first party or second party can broadcast the deposit mechanism.

The deposit mechanism can allocate the resource to the input of the locking mechanism and the transaction allocates the locking-output to the input of the locking mechanism, wherein the first party and second party sign, using their private keys, the first multi-signature address and second multi-signature address of the locking mechanism in advance of the transaction broadcast, such that when the transaction is broadcast, and the locking-output is assigned to the second multi-signature address, the locking mechanism is able to allocate the resource and the locking-output to the output of the locking mechanism, which is an address accessible by the second party.

The first party can broadcast the locking mechanism. Alternatively, the second party can broadcast the locking mechanism. The locking mechanism script can be written to stipulate the conditions upon which the inputs are allocated to the output.

The secure task-based access to a resource can have stages, said stages including: a first stage wherein the broadcast of the deposit mechanism allocates the resource to the first multi-signature address; and a second stage wherein the broadcast of the transaction allocates a locking-output to the second multi-signature address, wherein the completion of the first and second stage satisfy a condition that a task has been completed such that the subsequently broadcast locking mechanism receives the resource and locking-output as an input and allocates the resource and locking-output to an address accessible to the second party in exchange for the completion of the task.

Security can be improved by the resource and locking-output being assigned to multi-signature addresses, which must be signed by both parties, as part of the locking mechanism script, to release them to the output of the locking mechanism. The condition can be set/managed because the output depends upon both the resource and the locking-output (dust) being available to the input.

The method can function to provide a mutual benefit to both parties. The second party can additionally provide secure task-based access to a second resource, said access being conditional upon a second task being performed by the first party, wherein the second task includes broadcasting a second transaction by the first party on a blockchain in exchange for access to the second resource, the method further including: in addition to the first party collaborating with the second party to create the first multi-signature address and the second multi-signature address, the second party collaborates with the first party to create a third multi-signature address and a fourth multi-signature address. The broadcast of the deposit mechanism can further include the second party allocating the second resource to the third multi-signature address. The second party builds a second task, said second task including the broadcast of a second transaction, and sends said task to the first party for broadcast on the blockchain, said transaction having a second transaction output, and a second locking-output (d) allocated to the fourth multi-signature address. The second transaction output, like the first transaction output, is optional, for the same reasons. The second party creates and sends a second locking mechanism to the first party, or receives a second locking mechanism from the first party, wherein the input to said second locking mechanism is the second resource and the second locking-output, which are locked by their multi-signatures, and the output from said second locking mechanism is the second resource and the second locking-output, wherein the second party signs the third multi-signature address and fourth multi-signature address, enabling the first party to sign the third multi-signature and fourth multi-signature, thus unlocking the input to the locking mechanism enabling the output to be allocated to an address accessible by the first party, wherein said output is conditional upon the second resource and the second locking-output being allocated to their multi-signatures on the blockchain, wherein upon confirmation of the transaction being broadcast, the locking mechanism is broadcast on the blockchain thus allocating the second locking-output to the fourth multi-signature address and enabling the first party to access the second resource and the second locking-output.

The steps and or arrangements of the methods are applicable, in light of the teaching herein, to the various scenarios in which the condition is one-way or reciprocal, or for refund or reward.

The output of a locking mechanism can be allocated to a reward address accessible by the party who has completed a task.

The first party can broadcast a deposit mechanism that allocates a resource to the first multi-signature address, and the broadcast of the deposit mechanism can further include the second party allocating the second resource to the third multi-signature address, such that access to the resource and second resource can be provided by one party for another party in exchange for completion of a task.

The 'reward' can mean a party getting access to the resource they originally input to the deposit mechanism in exchange for completing a task. The first party can broadcast a deposit mechanism that allocates a resource to the third multi-signature address, and the broadcast of the deposit mechanism further includes the second party allocating the second resource to the first multi-signature address, such that access to the resource and second resource is retained by a party when said party completes a task assigned by the other party.

The method can further include: the first party creating a first compensation mechanism that enables the first party to allocate the second resource allocated to the deposit mechanism by the second party to a compensation address accessible by the first party, when (i) the first party has broadcast the transaction of the second party, and (ii) the second party fails to broadcast the transaction of the first party within a second predetermined period of time following the first party sending a transaction to the second party; and/or the second party creating a second compensation mechanism that enables the second party to allocate the resource allocated to the deposit mechanism by the first party to a compensation address accessible by the second party, when (i) the second party has broadcast the transaction of the first party, and (ii) the first party fails to broadcast the transaction of the second party within a second predetermined period of time following the second party sending a transaction to the first party.

The countdown for the second predetermined period of time can begin from the broadcast of the locking mechanism or refund mechanism and/or the compensation mechanism. The compensation mechanism is signed before broadcast of the compensation scheme. And, preferably, before broadcast of the refund mechanism. The second predetermined period of time can be shorter than a first period of time.

The second party (B) can access or reassign the second resource if the first party (A) fails to sign and exchange their transaction for broadcast within a first predetermined period of time (T1) following the second party sending a transaction to the first party, and/or the first party (A) can access or reassign the resource if the second party (B) fails to sign and exchange their transaction within a first predetermined period of time (T1) following the first party sending a transaction to the second party.

In another aspect, the invention resides in a computer-implemented method for configuring secure task-based access to a resource, said access being conditional upon a task being performed by a second party, wherein the task includes broadcasting a transaction on a blockchain in exchange for access to a resource, the method including: a second party collaborating with a first party to create a first multi-signature address and second multi-signature address; the second party verifying that a deposit mechanism that allocates a resource to the first multi-signature address has been broadcast on the blockchain; receiving a task from the first party, said task including the broadcast of a transaction, said transaction having a locking-output allocated to the second multi-signature address, and optionally, a transaction output; and creating and sending a locking mechanism to the first party, or receiving a locking mechanism from the first party, wherein the input to said locking mechanism is the resource and the locking-output, which are locked by their respective multi-signatures, and the output is the resource and the locking-output signing the first multi-signature address and second multi-signature address, enabling the first party to sign the first multi-signature address and second multi-signature address, thus unlocking the input to the locking mechanism enabling the output to be allocated to an accessible address, wherein said output is conditional upon both the resource and the locking-output being allocated to their multi-signature addresses on the blockchain, broadcasting the transaction on the blockchain, wherein upon confirmation of the broadcast, the locking mechanism is broadcast on the blockchain thus allocating the locking-output to the second multi-signature address and enabling to access the resource and the locking-output.

It is to be noted that the actions that can be taken by Alice can similarly be taken by Bob.

Overall, the method is suitable for enabling conditional and secure access to financial and non-financial resources. This can be achieved through the staged broadcast of customised transactions and their interaction with a blockchain. Conditional access to resources such as information, resources, passwords or even cryptocurrency is feasible. These transactions can contain data, or metadata, which can be embedded with a script or in an output return script. Additionally or alternatively to examples provided herein, additional outputs can be incorporated into the deposit mechanism and/or the main transaction to provide data, such as an encrypted link to a document, in exchange for the completion of the task, which includes broadcast of the main transaction. The additional output can be accessed by methods or procedures written into the data, or metadata of a transaction.

In another aspect, the invention resides a computer readable storage medium comprising computer-executable instructions which, when executed, configure a processor to perform the method of the claims herein.

In another aspect, the invention resides in an electronic device comprising: an interface device; one or more processor(s) coupled to the interface device; a memory coupled to the one or more processor(s), the memory having stored thereon computer executable instructions which, when executed, configure the one or more processor(s) to perform the method of the claims herein.

In another aspect, the invention resides in a node of a blockchain network, the node configured to perform any of the methods claimed herein. In another aspect, the invention resides in a blockchain network having a node as claimed herein. Such an improved solution has now been devised.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 9 is an example of the locking script for the deposit of x Bitcoin made by Alice.

DETAILED DESCRIPTION

Figure 1:
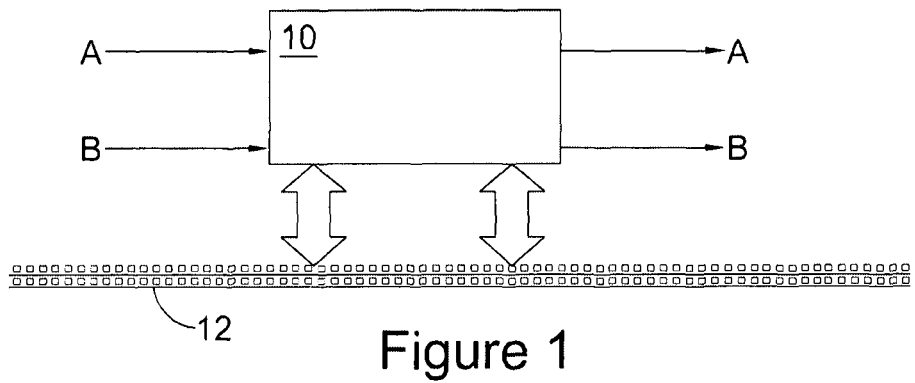
FIG. 1 is schematic representation of a process having inputs from a first and second party, a mechanism that determines the output to the first and/or second party, said process involving a connection with the blockchain to read the blockchain and broadcasting on the blockchain network.

The invention can be described, by way of example, using a process 10 as shown in FIG. 1, which receives an input from a first party, nominally "Alice" or "A" and a second party "Bob" or "B". The mechanism provides an output to Alice and/or Bob. The mechanism 10 can broadcast on a blockchain network 12 and/or retrieve information from a blockchain 12, as indicated by the double-ended arrows in FIG. 1, which can represent a broadcast to the blockchain network 12 or blockchain 12.

The process 10 represents one or more of the processes or mechanisms described below or in the method as claimed. The mechanism, and mechanisms described herein, can be considered as a transaction, or collection of transactions. The process 10 in FIG. 1 represents a logic-gate having inputs and outputs, wherein said outputs are conditional on the inputs and actions of Alice and Bob in relation to the blockchain.

Alice and Bob create multi-signature keys that secure transactions that are broadcast. It is to be noted that a plurality of transactions are broadcast, and the sequential broadcast of the transactions functions to improve security.

The mechanism also enables Alice to make a resource conditionally available to Bob in exchange for Bob completing a task, and vice-versa. Alice and Bob collaborate to make an initial broadcast on the blockchain. The task includes Bob broadcasting a transaction, created by Alice, on the blockchain. When Bob completes said task, indicated by the broadcast of Alice's transaction, an access mechanism enables Bob to unlock the resource.

General Example—Overview

The conditional access to resource, which is secured by the use of multi-signatures and the broadcasts made to the blockchain network, is conditional upon a task being performed or criteria/condition being met, or a triggering event occurring. Performance of the task may provide the triggering event. Upon detection of the triggering event and/or performance of the task, access to the controlled resource may be permitted, facilitated or enabled. The resource is secure until the performance is complete and part of an assigned task, namely the broadcast of a transaction, is identifiable on the blockchain or network. This process can be described, purely by way of example, as analogous to a publisher (Alice) enabling Bob to access digital rights, such as a secure online document, when Bob performs a task.

Initially, Alice and Bob agree on the task and the secure online document to be accessed. Alice can then broadcast a transaction including a code that Bob can later use to access the secure document. Alice also creates a transaction for Bob to broadcast on the blockchain, wherein said transaction has a plurality of outputs and the task includes broadcasting the transaction. Finally, an unlock transaction can be broadcast when the transaction has appeared on the blockchain, by Alice or Bob, to enable Bob to access to the code. Bob can access or unlock the code only when the code is assigned to the input of the unlock transaction, Bob broadcasts the transaction and the unlock transaction is subsequently broadcast. Not only do the staged broadcasts provide for performance-based access but the creating of a transaction by Alice for the broadcast by Bob obfuscates the source of the transaction.

General Example—Details

Figure 7:
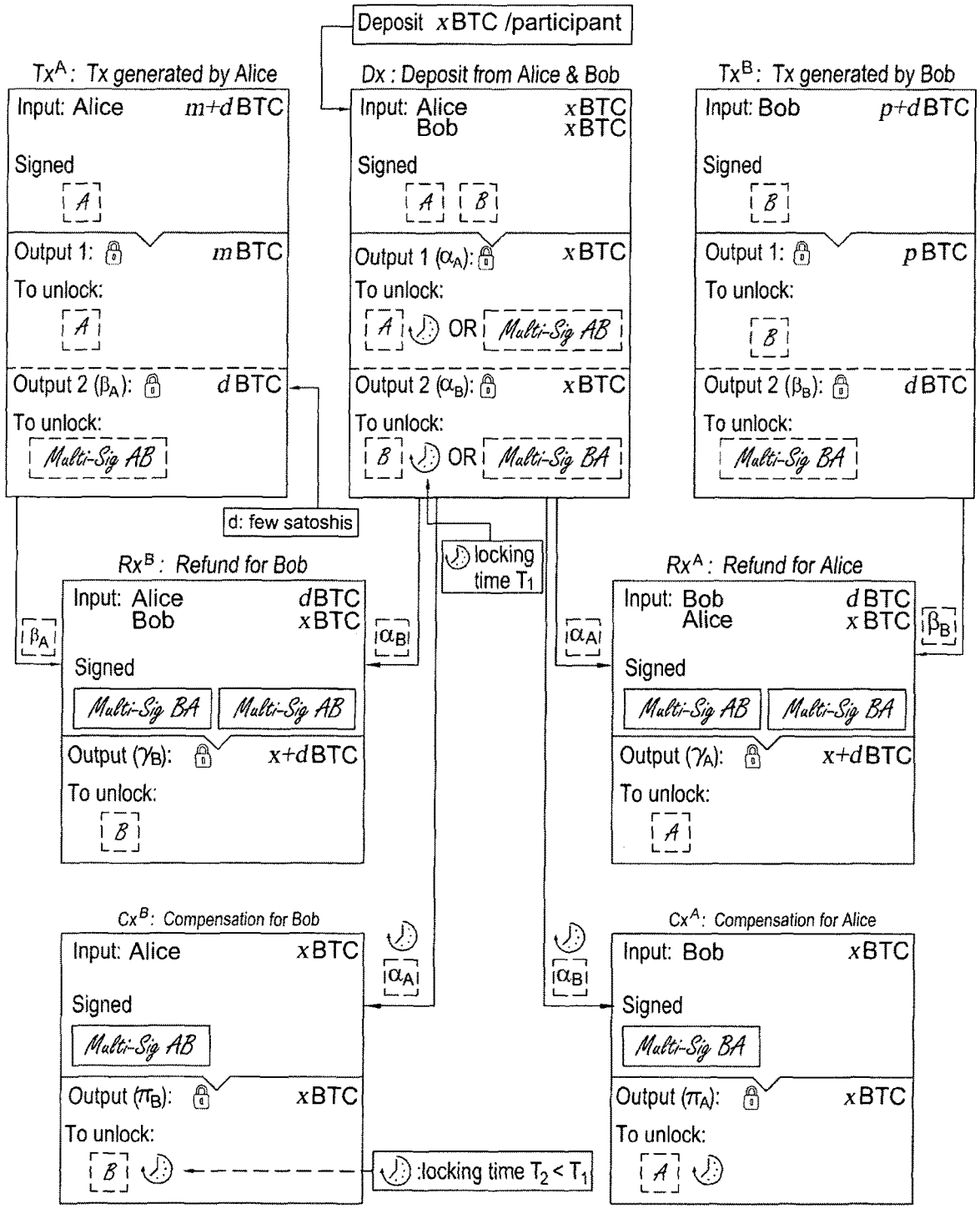
FIG. 7 is a diagram showing the relationships between a deposit transaction, transaction, refund transaction and compensation transaction.

A summary of features are shown in FIG. 7, which shows a plurality of transactions or mechanisms that enable Alice and Bob to collaborate and mutually offer each other access to a resource, or retain a deposit resource, in exchange for broadcasting the other's transaction. More generally, however, the invention enables the conditional offer of access to a resource in exchange for a task to be one-way.

Using FIG. 7 as a guide in order that the relationships between the transactions can be appreciated, Alice broadcasts a deposit mechanism ($D_x$) having an input (x) and an output (x) that is assigned to a first multi-signature address ($\alpha_B$), said address being created by Alice and Bob. The input (x) is the resource that Bob wishes to use to access, for example, a secure on-line document.

Alice then creates a transaction ($T_x^A$), which Bob will subsequently broadcast as part of a task. In addition to broadcasting the transaction the task can include, by way of example, making a payment, providing access to a computing resource or fulfilling a contractual condition. The broadcast of the transaction signifies that the task is complete. There are two inputs and outputs to Alice's transaction ($T_x^A$) in the example given. One of the outputs is optional, and involves a transaction output (m) to an address accessible by Alice. More importantly, a locking-output (d) is allocated to a second multi-signature address ($\beta_A$).

The resource (x) and the locking-output (d) are allocated to the first and second multi-signature addresses, respectively, and require Alice and Bob to sign, using their private keys, to release the resource and the locking-output from said addresses. For explanatory purposes, the resource and the locking-output are to be treated as unspent transactional outputs (UTXO) on the blockchain.

To enable Bob to access the resource after broadcasting Alice's transaction ($T_x^A$), a locking mechanism ($R_x^B$) is created. The inputs to said locking mechanism are (i) the resource (x), which is already available because it was allocated to the first multi-signature after the broadcast of the deposit mechanism ($D_x$), and (ii) the locking-output, which will be available after Bob broadcasts Alice's transaction. The locking mechanism is also referred to as a 'refund' mechanism because in the example application Alice and Bob allocate funds to inputs of the deposit mechanism and, when they have completed their task, they effectively retrieve their funds via the locking mechanism or refund mechanism. Providing an example in which a refund is offered supports the illustration of the use of the compensation mechanism.

Alice and Bob collaborate and use their private keys to release the resource and the locking-output, thus providing an input to the locking mechanism. The output from the locking mechanism is allocated to an address accessible to Bob.

It is to be noted that the output from the locking mechanism i.e. the access to a resource, is conditional upon both inputs (UTXO) being present on the blockchain. In this way, Bob's access to the resource is conditional on Bob broadcasting the transaction because the locking-output must be available for allocation to the locking mechanism. To be clear, upon confirmation of the broadcast of the transaction, the UTXO of the locking-output is sent to the second multi-signature address of the locking mechanism and, because the UTXO of the deposit is already present on the blockchain and both multi-signature addresses have been signed, the UTXO input can be allocated to Bob. This is because the script of the locking mechanism allocates the UTXO input to Bob's address only when both inputs are present. In other words, two criteria are satisfied, that is (i) the inputs in the refund mechanism can be identified as UTXO on the blockchain, and (ii) the signatures associated with those inputs are valid.

When Bob confirms the transaction is on the blockchain he knows the UTXO of the locking-output is available and the locking mechanism is subsequently broadcasts—by Alice or Bob.

Simplified Example—Overview

To highlight the features of the invention, Alice and Bob will, by way of example, agree to create their own transaction and provide it to the other for broadcast on a blockchain. The resource that will be accessed could be, for example, an encrypted document or access to a process, but will be an amount of cryptocurrency, such as Bitcoin (BTC), in this example. Alice and Bob can deposit an amount of Bitcoin that functions as a payment in exchange for broadcasting a transaction however in this simplified example, Alice and Bob will deposit an amount of Bitcoin as a deposit and retrieve their deposit upon broadcast of the transaction provided to them.

If, for example, Alice broadcasts Bob's transaction and subsequently retrieves her deposit, but Bob fails to broadcast Alice's transaction within a predetermined period of time, then Alice can access Bob's deposit as compensation.

Although this example is cryptocurrency based, and involves placing and retrieving a deposit instead of providing access to a resource in exchange for completion of a task, the transactions and mechanisms are similar. The simplified example below highlights the conditional access functionality as well as the improvements on security, which serve to obscure the source of a transaction. Moreover the method enables improved or trust-less collaboration between parties.

Simplified Example—Details

The participants Alice and Bob place a deposit of cryptocurrency, such as Bitcoin, via a deposit transaction. The transaction that they wish the other party to broadcast is altered in such a way that a subsequently generated refund transaction, or locking mechanism, relies on the confirmation in the blockchain that the transactions exchanged are broadcast by the other participant. In general, and in this specific example, two participants are able to enter an agreement where at least one of them performs an action or task on behalf of the other in exchange for access to a resource—whether it be a reward or refund of the Bitcoin input to the deposit transaction.

In the specific example both commit to perform an action each. The broadcast of the main transactions represent the actions, or the proof of an action taken by the participants, and the refund and compensation mechanisms put in place incentivise each participant to honour their end of the commitment. In the general and specific examples, transactions or mechanisms can be exchanged directly off-chain before the actual submission or broadcast on the blockchain.

Introduction

As shown in FIG. 1, Alice and Bob provide an input to a process 10, in which they create and exchange transactions before broadcast on the blockchain. Alice generates a transaction $T_x^A$ in which she will spend a number (m) of Bitcoins. Bob generates a transaction $T_x^B$ in which he will spend a number (p) of Bitcoins.

It is to be noted that neither Alice nor Bob are necessarily the recipient of the funds in their transactions $T_x^A$ and $T_x^B$. Alice could be moving funds from one of her addresses to a new address for which she has the private key, or be making a payment to a third party, nominally 'Charlie'. In this case, the funds can be unlocked with the signature of the recipient. This also holds for Bob's transaction $T_x^B$.

$T_x^A$ and $T_x^B$ are the main transactions to be exchanged and broadcast by another party. In the example given below a mutual exchange and broadcast is expected.

Alice and Bob could exchange and broadcast each other's transaction on the basis of goodwill, but to add a layer of security and/or motivate the other participant to fulfil their roles then access to a resource i.e. return of a deposit amount of cryptocurrency, is provided and made conditional upon broadcast of the transaction sent to Alice or Bob. It is to be noted that in this simplified example the motivation is the return of a deposit, but could be a payment of cryptocurrency or could, as described in the general example above be access to a resource or process.

To implement conditional access to a resource, refund or reward in the overall process, Alice and Bob alter their main transaction $T_x^A$ and $T_x^B$, by adding a second output of a very small value of cryptocurrency, such as a few Satoshis, which are the smallest unit of Bitcoin (1 Satoshi=0.00000001 Bitcoin)—referred to as dust (d)—locked under a pay-to-script-hash (P2SH) requiring both Alice and Bob's private keys.

Alice and Bob also agree to commit an amount 'x' of Bitcoins in a deposit transaction ($D_x$). The x Bitcoin in the deposit transaction and the dust d added to the original transactions that are exchanged in this protocol are used as inputs for each of a pair of (i) refund transactions—$R_x^A$ for Alice, and $R_x^B$ for Bob—and (ii) compensation transactions—$C_x^A$ for Alice and $C_x^B$ for Bob.

If Alice and Bob broadcast the main transaction provided to them then they will collect their deposit and the dust via the refund transactions. If a participant does not broadcast the other participant's main transaction after a certain time the latter would collect the deposit committed by the former as a compensation for her wasted efforts.

The different transactions and steps taken, as well as the generation of the multi-signature addresses are described below. In the method, the amount 'x' of Bitcoins input to a deposit transaction can be considered as the 'resource'. The dust d added to the original transactions can be considered as the 'locking-input' because it functions to lock the deposit and impose a condition on a party to broadcast another party's transaction to access the resource.

Key Generation/Exchange

Alice and Bob generate two new private-public key pairs each and exchange their public keys through a secure channel. Respectively Alice and Bob's keys are $\{P_A^1, P_A^2\}$ and $\{P_B^1, P_B^2\}$. Alice and Bob keep secret the corresponding private keys, respectively $\{S_A^1, S_A^2\}$ and $\{S_B^1, S_B^2\}$.

Alice creates two multi-signature addresses using both Bob's and her own public keys as follows:

$$Add_{AB}^1 = \alpha_A = 2\text{-}2(P_A^1, P_B^1)$$

$$Add_{AB}^2 = \beta_A = 2\text{-}2(P_A^2, P_B^2)$$

Both Alice and Bob's Ovate keys will be required to release and transfer the funds or resource sent to these multi-signature addresses. Bob also creates a pair of multi-signature addresses using both Alice's and his public keys as follows:

$$Add_{BA}^1 = \alpha_B = 2\text{-}2(P_B^1, P_A^1,)$$

$$Add_{BA}^2 = \beta_B = 2\text{-}2(P_B^2, P_A^2)$$

Alice and Bob use their public keys first to create their respective multi-signature addresses, leading to $Add_{AB}^1$ being different and unlinkable to $Add_{BA}^1$, and $Add_{AB}^2$ being different and unlinkable to $Add_{BA}^2$. Alice and Bob then exchange their newly created multi-signature addresses and verify their validity knowing the public keys used to construct these.

Deposit Mechanism—The First Broadcast

Figure 2:
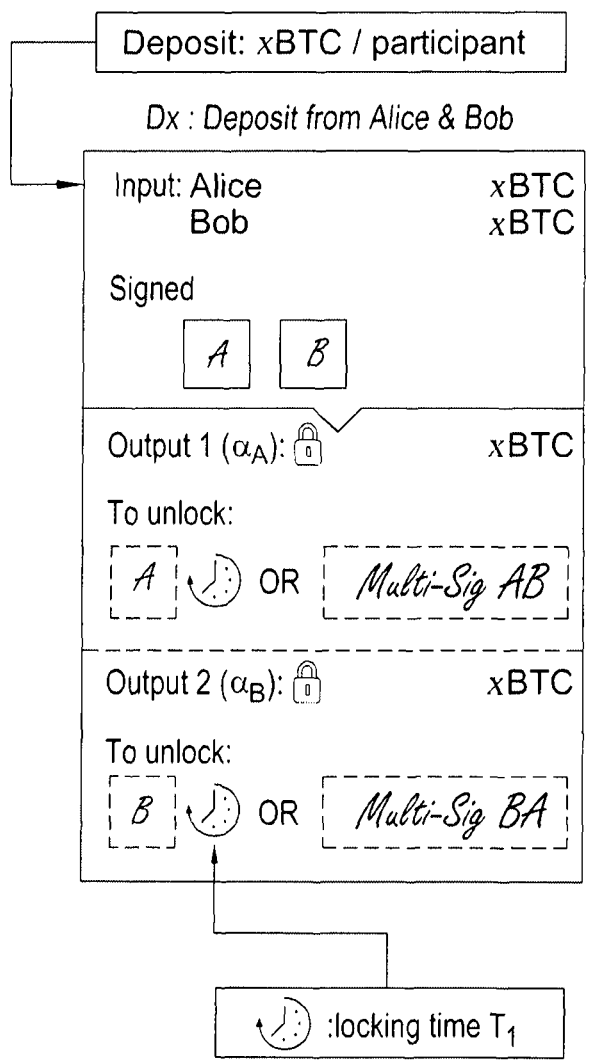
FIG. 2 is a diagram indicating the inputs and outputs of a deposit transaction for broadcast on a blockchain.

FIG. 2 represents a deposit mechanism or transaction $D_x$ to which Alice and Bob each commit an amount x of Bitcoin (in one example, BTC, but other currencies could be used), shown as an input. These inputs or allocations are signed by Alice and Bob. The deposit transaction $D_x$ is agreed beforehand to be a 2 input-2 output P2SH transaction. The unspent transactions (UTXOs) from $D_x$ are outputs that are used later as inputs to create two further transactions—one per participant.

The further transactions are (i) $R_x$—a refund mechanism that allocates the x BTC committed in $D_x$ to a specified address when a participant broadcasts the other participant's main transaction in the blockchain network and it is recorded on the blockchain, and (ii) $C_x$—a compensation mechanism that compensates a participant in case her transaction is not broadcast by the other participant after a certain amount of time despite the fact that she broadcast the other's transaction.

Using the multi-signature addresses previously generated, Alice and Bob create the locking script that will be used to lock the funds spent in $D_x$.

Alice constructs the locking script for her deposit in the $D_x$ transaction. This script will offer two options to spend the associated output amount from the deposit mechanism. The output will either send Alice's x BTC to the address $Add_{AB}^1$ ($\alpha_A$) that can be redeemed by both Alice and Bob signing with their private keys, $S_A^1$ and $S_B^1$ respectively. Alternatively, after a certain period of time T1, the output can be redeemed via an address associated to Alice's public key $P_A^1$.

The locking time T1 value is chosen so that the funds can be redeemed by Alice at some point in the future if the protocol finishes without the main transactions, refund mechanisms or compensation mechanisms being signed and exchanged. The locking time parameter is defined using the opcode:

OP_CHECKSEQUENCEVERIFY

Note that this opcode for the Bitcoin scripting system was introduced in BIP112, and allows execution pathways of a script to be restricted based on the age of the output being spent (https://github.com/bitcoin/bips/blob/master/bip-0112.mediawiki).

Note that the second option defined in the script also acts as a safety net for Alice in case the protocol finishes before the refund and compensation scheme in the method is in place.

Similarly Bob prepares the locking script for his deposit in the $D_x$ transaction. Bob's x Bitcoin will either be sent to the address $Add_{BA}{}^1$ ($\alpha_B$) that can be redeemed by both Alice and Bob signing with their private keys ($S_A{}^1$ and $S_B{}^1$), or after a locking time T1 to an address associated to Bob's public key $P_B{}^1$. An example of the locking script for the deposit of x Bitcoin made by Alice is shown in FIG. 9.

Bob sends his script to Alice. She then creates the transaction $D_x$, specifying her and Bob's outputs. She adds her input and signs it with a SIGHASH_ANYONECANPAY flag. Alice then sends the transaction to Bob who in turn adds and signs his input.

As shown in FIG. 2, the output addresses of the x Bitcoin spent by Alice and Bob are denoted as $\alpha_A$ and $\alpha_B$, respectively, in Dx. The deposit transaction $D_x$, as shown in FIG. 2, is ready to be broadcast, by Alice or Bob, on the network. Alice and Bob both verify that the transaction was broadcast and confirmed on the Bitcoin blockchain.

Alice and Bob then alter and exchange their main transactions $T_x{}^A$ and $T_x{}^B$, respectively, as detailed below. If they have not completed the exchange nor broadcast the other participant's main transaction before T1 they will get their deposit back and the protocol will end.

The Main Transaction

Figure 3:
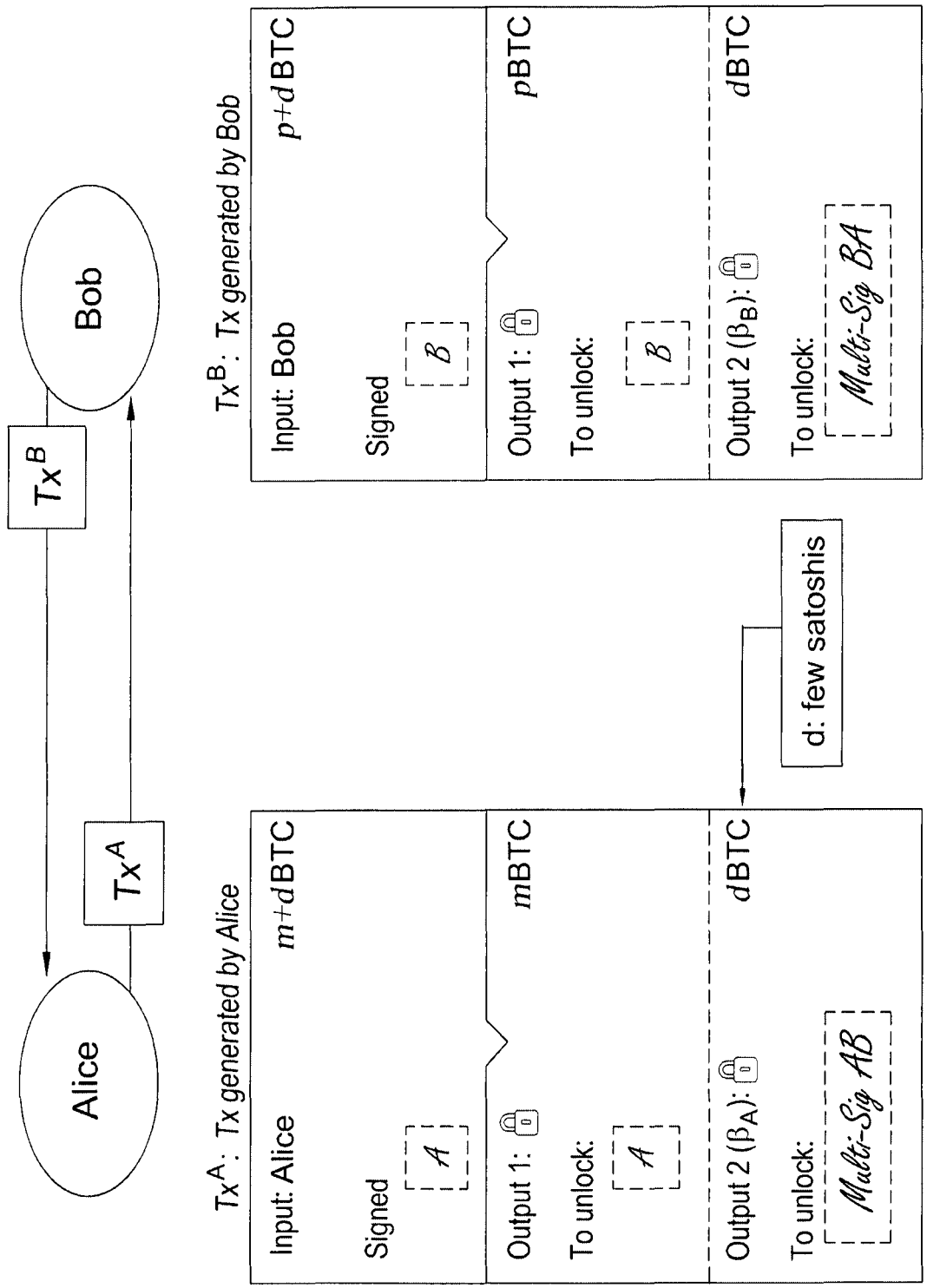
FIG. 3 is a diagram indicating two transactions for broadcast on a blockchain, each transaction having inputs and outputs, said transactions being exchanged between Alice and Bob.

FIG. 3 represents the main transactions of Alice and Bob—$T_x{}^A$ and $T_x{}^B$, respectively. The broadcast of these transactions form at least part of the task assigned to another. To be clear, Alice's main transaction $T_x{}^A$ is sent to Bob for him to broadcast, and vice-versa. Broadcasting the other's transaction is a condition on obtaining a refund, reward or access to a resource.

Before Alice broadcasts Bob's transaction $T_x{}^B$ or Bob broadcasts Alice's $T_x{}^A$, additional mechanisms are configured, these are: a refund transaction or mechanism $R_x$ that provides a means for the broadcaster of the main transaction to conditionally access the resource, which in this example is the payment broadcast in the deposit $D_x$; and an optional compensation mechanism $C_x$ that enables a party who has broadcast a main transaction, but has not had their own transaction broadcast, to additionally conditionally access or retrieve the other resource in the deposit $D_x$, which in this example is also a payment. Through the refund mechanism $R_x$ conditions are imposed on the parties because the mechanism $R_x$ functions to constrain how the resource or funds in the deposit $D_x$ are accessed or allocated.

Before the main transactions $T_x{}^A$, $T_x{}^B$ are exchanged for broadcast, Alice and Bob agree on an additional output, or locking-output d, that is included in the transaction. Once broadcast and available on the Bitcoin blockchain, the locking-output will function to satisfy a condition of the subsequently published refund mechanism i.e. that both the resource and locking-input UTXO are present on the blockchain and allocated to their respective multi-signature addresses.

The locking-output functions as a trigger because Alice or Bob can only access a resource after they have performed a task that includes broadcasting a transaction of the other party. This resource is secured by a refund transaction or mechanism $R_x$. The refund mechanism requires that the first multi-signature address ($\alpha_A$, $\alpha_B$) and second multi-signature address ($\beta_A$) created by Alice and Bob are signed by both parties before the refund mechanism is broadcast. By signing the multi-signature addresses before broadcast the inputs to the locking mechanism are released for allocation to a designated address of Alice or Bob—$\gamma_A$ and $\gamma_B$, respectively. It is for this reason that Alice builds into her main transaction $T_x{}^A$ a locking-output (a small but functional resource to be transferred—such as dust e.g. a few Satoshis) that is secured by a second multi-signature address ($\beta_A$). Only when the main transaction has been broadcast will the conditions of the refund mechanism be satisfied thus enabling the output of the refund mechanism. Note that the refund mechanism should be broadcast after the transaction has been broadcast because a failure to do so will inhibit it from being validated by a node or nodes and compiled in a block for addition to the blockchain.

The resource accessible, or offered via the locking-output in this example is a token amount of cryptocurrency, for example some dust d of BTC i.e. a few Satoshis. This second, or locking-output, has the second multi-signature addresses $\beta_A$ as an output address.

To be clear, Alice's main transaction has an output in which she wishes to spend a number (m) of Bitcoins, and a locking-output of dust (d)—locked under a pay-to-script-hash (P2SH)—having a destination address $Add_{AB}{}^2$ ($\beta_A$) requiring both Alice and Bob's private keys to be used to access or unlock the locking-output. Similarly, Bob's main transaction has an output in which he wishes to spend a number (p) of Bitcoins, and a locking-output of dust (d)—locked under a pay-to-script-hash (P2SH)—having a destination address $Add_{BA}{}^2$ ($\beta_B$) requiring both Alice and Bob's private keys to be accessed or unlocked. Alice and Bob prepare their transactions $T_x{}^A$, $T_x{}^B$ with the two inputs before sending it to the other for broadcast. At this time, Alice and Bob do not broadcast the transactions they received from each other.

Before the main transactions $T_x{}^A$, $T_x{}^B$ are broadcast, Alice and Bob create: refund transactions—$R_x{}^A$ for Alice, and $R_x{}^B$ for Bob—that ensures the refund of a participant after the main transaction of the other participant is broadcast; and compensation transactions—$C_x{}^A$ for Alice and $C_x{}^B$ for Bob—that will compensate a participant in case her main transaction wasn't broadcast in due time by the other participant.

The Refund Mechanism

Figure 4:
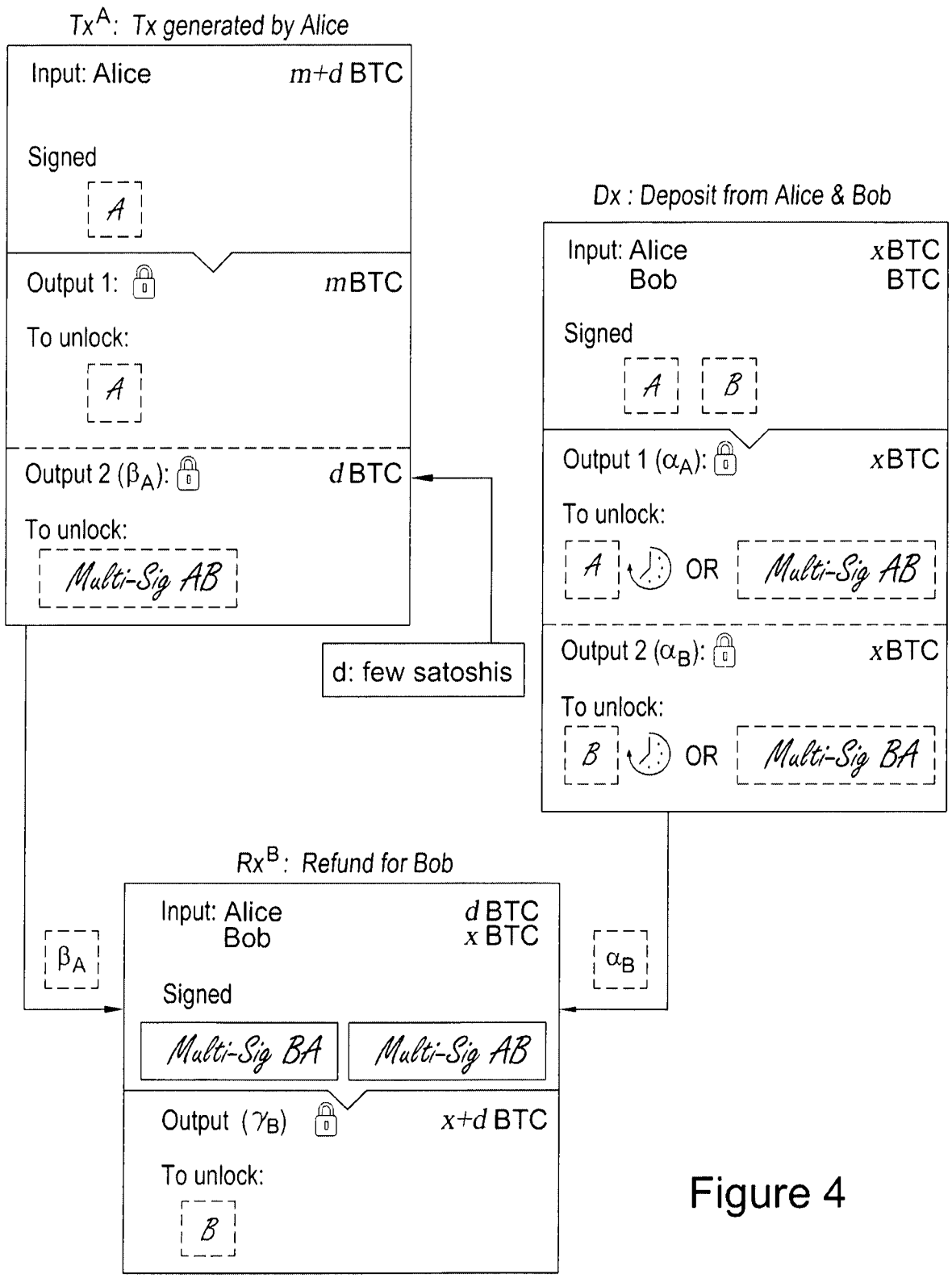
FIG. 4 is a diagram of a refund transaction having an input from the deposit transaction of FIG. 2 and the transaction of FIG. 3.

FIG. 4 shows the relationship between the deposit $D_x$, which will have been broadcast by Alice or Bob, the main transaction $T_x{}^A$ of Alice, which Bob will broadcast, and the refund mechanism for $R_x{}^B$ for Bob. At this stage Alice and Bob have exchanged their main transactions.

Alice creates her refund transaction $R_x{}^A$ using, as inputs, the UTXO sent to the address $Add_{AB}{}^1$ ($\alpha_A$) in the deposit transaction $D_x$ and the dust sent to the address $Add_{BA}{}^2$ ($\beta_B$) in the main transaction $T_x{}^B$ generated by Bob.

Similarly, Bob creates his refund transaction $R_x{}^B$ using, as inputs, the UTXO sent to the address $Add_{BA}{}^1$ ($\alpha_B$) in the deposit transaction $D_x$ and the dust sent to the address $Add_{AB}^2$ ($\beta_A$) in the main transaction $T_x^B$ generated by Bob.

Alice's refund, therefore, inherently depends on her broadcasting Bob's main transaction $T_x^B$ on the network. Alice sends her refund transaction $R_x^A$ to Bob who signs it and sends it back to Alice. Alice then signs the transaction $R_x^A$ but does not broadcast it because the transaction would not be confirmed since the bitcoins (dust) sent to $\beta_B$ are not available at this point in time. The resource, or dust, accessible at address $Add_{BA}^2$ ($\beta_B$) is made available or is spendable when the main transaction $T_x^B$ is broadcast and confirmed in the blockchain.

The two inputs in this newly created refund transaction $R_x^A$, require the signature of Alice and Bob as follows, these inputs are:

An input of x BTC from $D_x$ that are sent to the address $Add_{AB}^1$ ($\alpha_A$), which requires the signature of Alice and Bob using their first private keys, respectively $S_A^1$ and $S_B^1$.

An input of d BTC from $T_x^B$ that are sent to the address $Add_{BA}^2$ ($\beta_B$), which requires the signature of Alice and Bob using their second private keys, respectively $S_A^2$ and $S_B^2$.

Similarly, Bob's refund inherently depends on him broadcasting Alice's main transaction $T_x^A$ on the network. Bob sends his refund transaction $R_x^B$ to Alice who signs it and sends it back to Bob. Bob then signs the transaction $R_x^B$ but does not broadcast it because the transaction would not be confirmed since the bitcoins (dust) sent to $\beta_A$ are not available at this point in time. The resource, or dust, accessible at address $Add_{AB}^2$ ($\beta_A$) is made available or is spendable when the main transaction $T_x^A$ is broadcast and confirmed in the blockchain.

The two inputs in this newly created refund transaction $R_x^B$, require the signature of Alice and Bob as follows, these inputs are:

An input of x BTC from $D_x$ that are sent to the address $Add_{BA}^1$ ($\alpha_B$), which requires the signature of Alice and Bob using their first private keys, respectively $S_A^1$ and $S_B^1$.

An input of d BTC from $T_x^A$ that are sent to the address $Add_{AB}^2$ ($\beta_A$), which requires the signature of Alice and Bob using their second private keys, respectively $S_A^2$ and $S_B^2$.

The output of the refund transactions or mechanisms of Alice and Bob—$R_x^A$ and $R_x^B$—are allocated or secured by a refund, or reward, address of Alice and Bob, respectively named $\gamma_A$ and $\gamma_B$. An address can be chosen to further disassociate Alice and Bob from the main transaction and refund transaction.

The Compensation Mechanism

Figure 5:
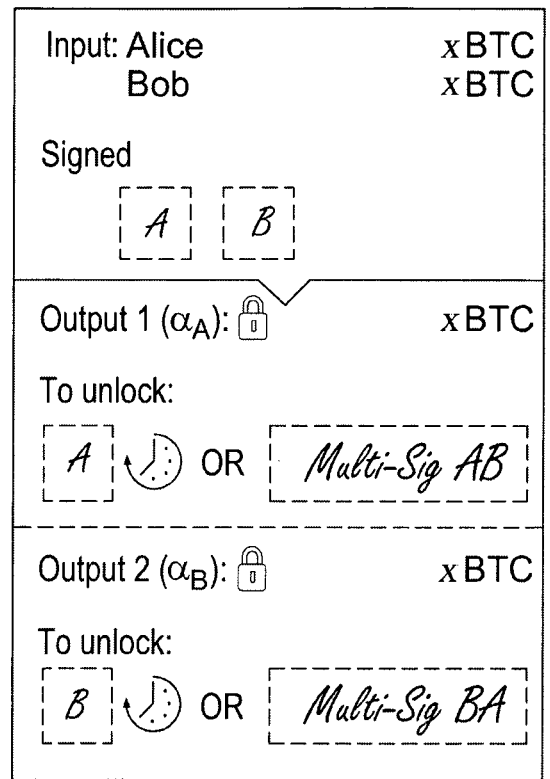
FIG. 5 is a diagram of a compensation transaction having an input from the deposit transaction of FIG. 2.
Figure 5:
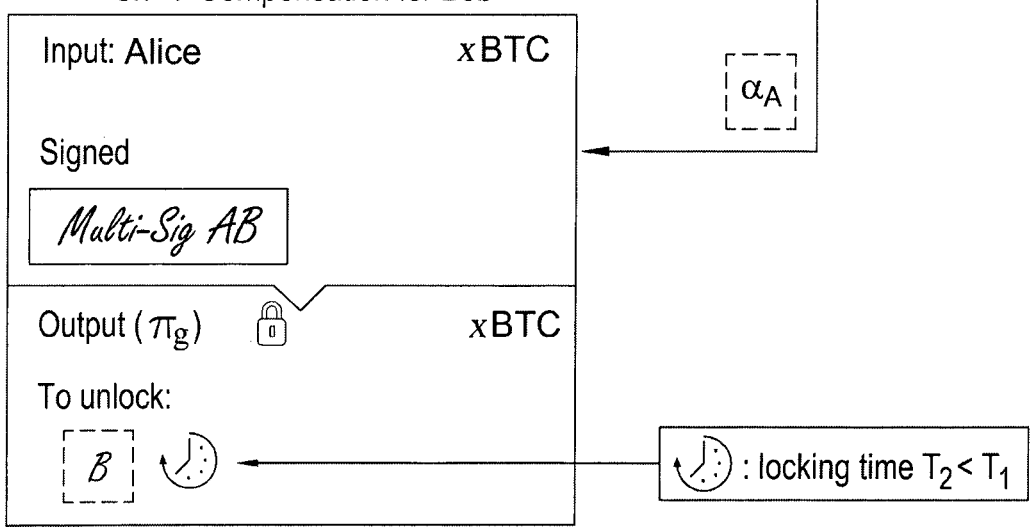

FIG. 5 shows the relationship between the deposit $D_x$, already broadcast by Alice or Bob, and a compensation transaction for Bob—$C_x^B$. The compensation transaction is optional and created to account for a scenario in which one participant does not broadcast the other participant's main transaction. If Alice does not broadcast Bob's main transaction $T_x^B$ but Bob does broadcast Alice's main transaction $T_x^A$ on the network, then Bob is able to retrieve the output from his refund transaction $R_x^B$ and, additionally, be compensated for her misconduct. In other words, Alice can be penalised for not having broadcast Bob's main transaction. This compensation mechanism can compensate a participant after a second predetermined period of time $T_2$ has lapsed since a main transaction was broadcast.

Before the main transactions $T_x^A$, $T_x^B$ are broadcast, Alice and Bob create compensation transactions—$C_x^A$ for Alice and $C_x^B$ for Bob.

Bob's compensation transaction $C_x^B$, for example, has in input of x BTC spent by Alice in the deposit transaction $D_x$. The output in the transaction $C_x^B$ is time-locked, according to the pre-agreed second predetermined period of time $T_2$. This period of time sets a maximum time allowed for the participants to broadcast the other's main transaction and see it confirmed on the network. Bob sends his compensation transactions $C_x^B$ to Alice who verifies it, signs it and sends it back to Bob—the input is Alice's x BTC secured by address $Add_{AB}^1$ ($\alpha_A$) that can be redeemed by both Alice and Bob signing with their private keys, $S_A^1$ and $S_B^1$ respectively.

Similarly, Alice's compensation transaction $C_x^A$, for example, has an input of x BTC spent by Bob in the deposit transaction $D_x$. The output in the transaction $C_x^A$ is time-locked, according to the pre-agreed second predetermined period of time $T_2$. This period of time sets a maximum time allowed for the participants to broadcast the other's main transaction and see it confirmed on the network. Alice sends her compensation transactions $C_x^A$ to Bob who verifies it, signs it and sends it back to Alice—the input is Bob's x BTC secured by address $Add_{BA}^1$ ($\alpha_B$) that can be redeemed by both Alice and Bob signing with their private keys, $S_A^1$ and $S_B^1$ respectively.

The output of the compensation transactions of Alice and Bob—$C_x^A$ and $C_x^B$—are allocated or secured by a compensation address of Alice and Bob, respectively $\pi_A$ and $\pi_B$. A different address is chosen to further disassociate Alice and Bob from the main transaction and refund transaction.

Note that the locking time value $T_2$ is chosen to allow time for both main transactions to be confirmed on the network, but be shorter than $T_1$. Locking time $T_1$ was selected so that the resource or funds secured in the deposit transaction can be redeemed at some point in the future if a main transaction, refund mechanism or compensation mechanism is not signed and exchanged.

It is to be noted that the output from the deposit mechanism is assigned to both the refund/reward/locking mechanism and the compensation mechanism. The locking mechanism input condition—receipt of the resource and the dust—is satisfied when the transaction has been broadcast i.e. a task has been done and condition has been met. The compensation mechanism can also receive the resource as an input. However, the UTXO of the resource cannot be used by both refund and compensation mechanisms and, therefore, a condition for the compensation mechanism is the timing requirement (T2) and the availability of the resource that has not been allocated by the locking mechanism.

The Second Broadcast

With the refund mechanisms $R_x^A$, $R_x^B$ and compensation mechanisms $C_x^A$, $C_x^B$ in place, and signed, then: Alice broadcasts on the network Bob's main transaction $T_x^B$ and her own compensation transaction; and Bob broadcasts on the network Alice's main transaction $T_x^A$ and his own compensation transaction $C_x^B$.

Upon confirmation of $T_x^B$ being broadcast on the network Alice then broadcasts her refund mechanism $R_x^A$ to claim her refund or reward. Alice then monitors the network for the broadcast of her main transaction $T_x^A$, and if it is not confirmed as being broadcast on the network before time $T_2$ has elapsed, then Alice can access the UTXO via the compensation mechanism $C_x^A$ via the address $\pi_A$ and effectively claim the deposit made by Bob.

Alternatively, if Alice sees that her transaction has been broadcast by Bob, and Bob has promptly broadcast his refund transaction $R_x^B$ (before time $T_2$ has lapsed) then the resource or funds i.e. the UTXO of the deposit $D_x$ has been 'spent' via Bob's refund mechanism and the address $\gamma_B$. This means that despite compensation mechanisms $C_x^A$ being broadcast, the UTXO from the deposit $D_x$ is no longer available thus invalidating $C_x^A$.

Upon confirmation of $T_x^A$ being broadcast on the network Bob then broadcasts his refund mechanism $R_x^B$ to claim his refund or reward. Bob then monitors the network for the broadcast of his main transaction $T_x^B$, and if it is not confirmed as being broadcast on the network before time $T_2$ has elapsed, then Bob can access the UTXO via the compensation mechanism $C_x^B$ via the address $\pi_B$ and effectively claim the deposit made by Alice.

Alternatively, if Bob sees that his transaction has been broadcast by Alice, and Alice has promptly broadcast her refund transaction $R_x^A$ (before time $T_2$ has lapsed) then the resource or funds i.e. the UTXO of the deposit $D_x$ has been 'spent' via Alice's refund mechanism and the address $\gamma_A$. This means that despite compensation mechanisms $C_x^B$ being broadcast, the UTXO from the deposit $D_x$ is no longer available thus invalidating $C_x^B$.

Overview—Order of the Transactions

Figure 6:
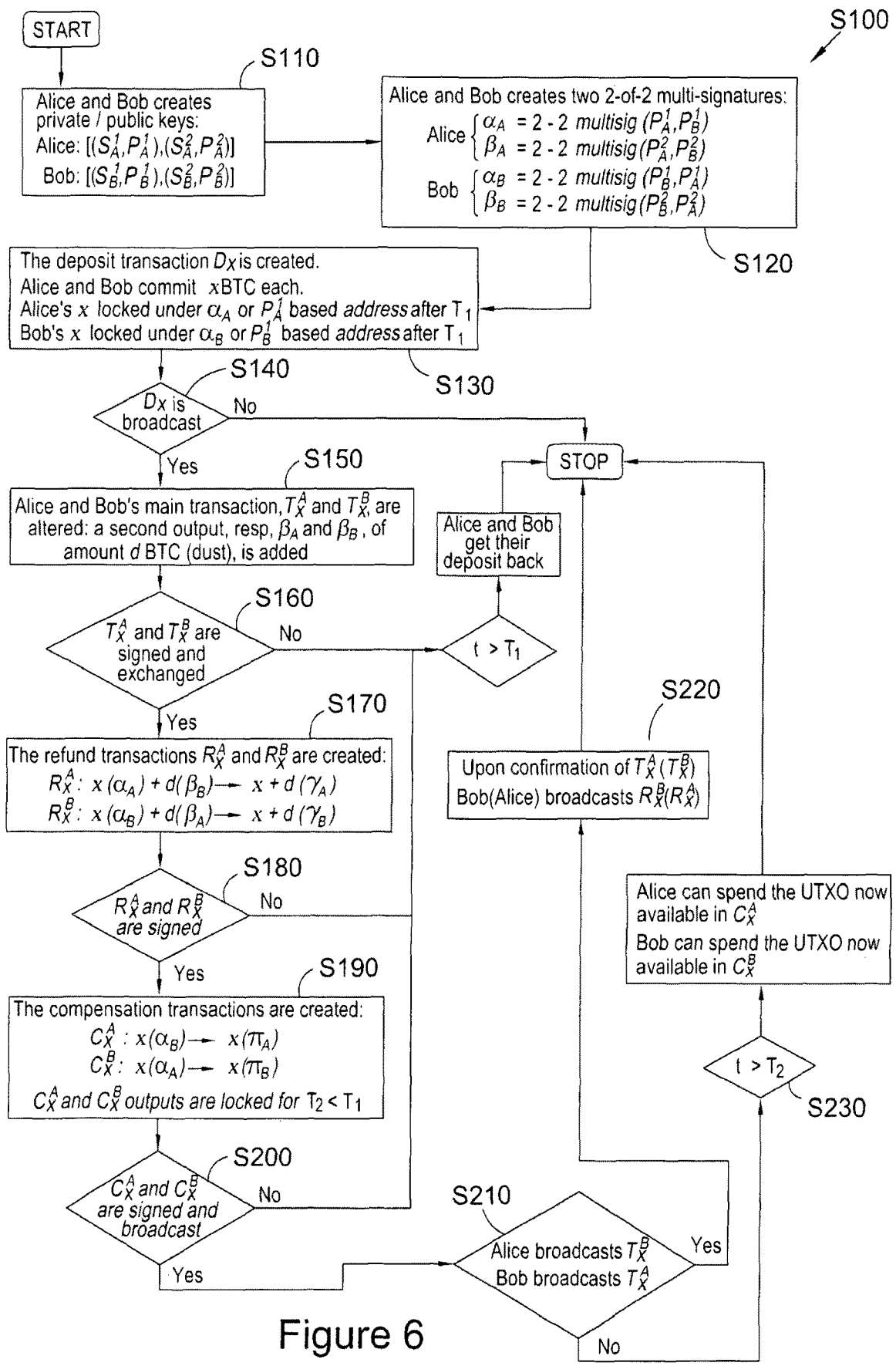
FIG. 6 is a flowchart indicating the order in which transactions can be signed and broadcast.
Figure 8:
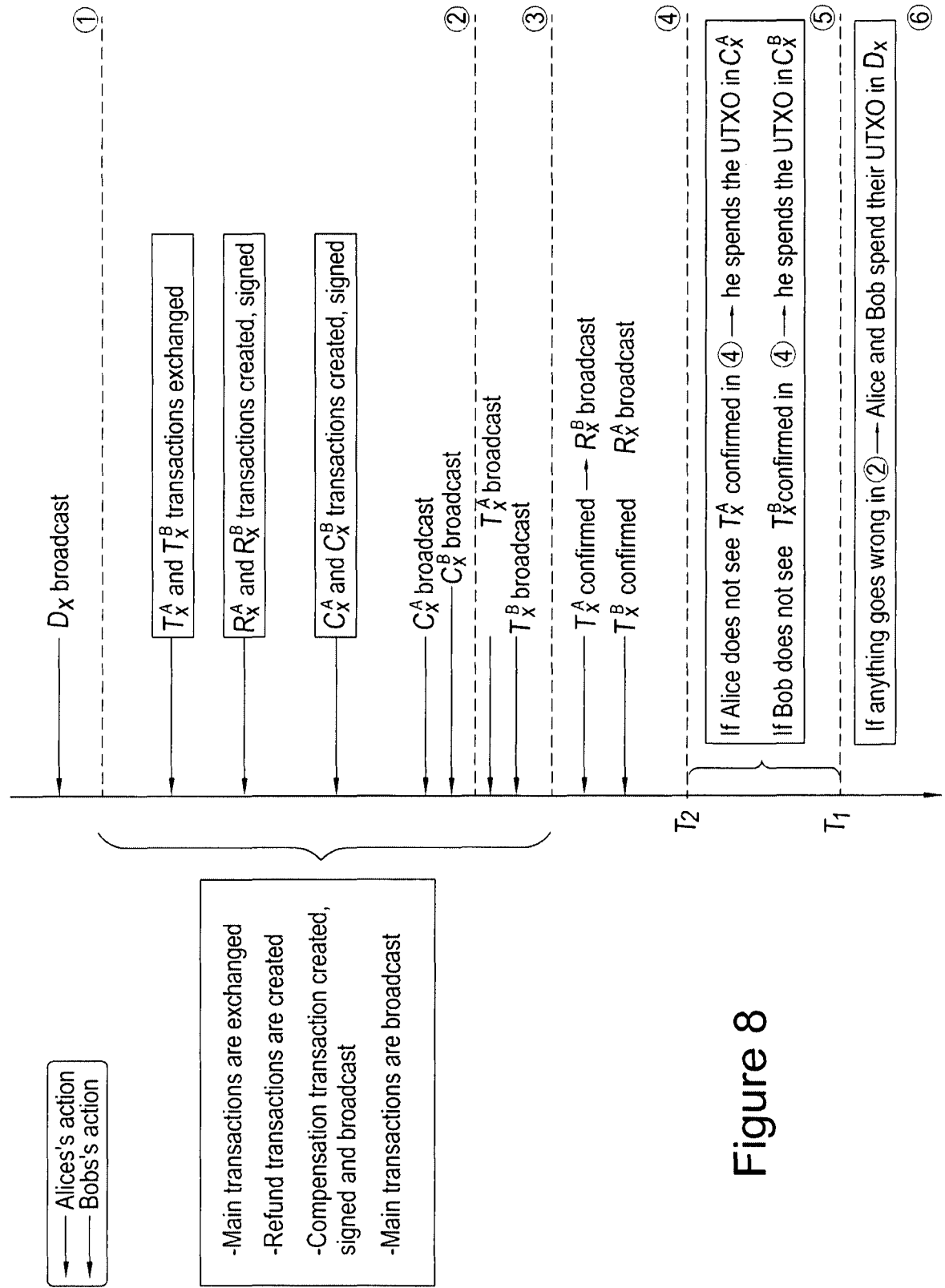
FIG. 8 is a diagram showing the order in which transactions are signed/or exchanged.

FIGS. 6 to 8 illustrate the example provided, with FIG. 7 showing the relationship between each of the transactions, and FIGS. 6 and 8 showing the steps or phases of the method. From this overview and in light of the teaching herein, it will be appreciated that although the example suggests that the direct transaction exchange is mutually beneficial for the parties involved, and that the resource accessed is an amount of cryptocurrency, the invention is not limited to the example provided.

Generally, the invention resides in a novel approach for configuring secure task-based or conditional access to a resource, said access being conditional upon a task being performed, wherein the task includes placing a transaction on a blockchain in exchange for access to a resource. In other words, Alice can provide a transaction $T_x^A$ for Bob to broadcast as part of a task and in return Bob can access a non-financial related resource via the deposit $D_x$, which is secured by a first multi-signature address ($\alpha_B$) of both parties. The process can be one-sided although the example given involves two parties.

After Bob performs the task of broadcasting the transaction $T_x^A$ he can access the resource by broadcasting his refund transaction or mechanism $R_x^B$. The refund mechanism requires that the first multi-signature address ($\alpha_B$) and second multi-signature address ($\beta_A$) created by Alice and Bob are signed by both parties before the refund mechanism is broadcast. It is for this reason that Alice builds into her main transaction $T_x^A$ locking-output (a small but functional resource to be transferred—such as dust e.g. a few Satoshis) that is secured by a second multi-signature address ($\beta_A$).

When Bob receives the transaction $T_x^A$, he broadcasts the transaction on the blockchain. Upon confirmation of the transaction being broadcast, Bob broadcasts his reward mechanism $R_x^B$, the output of which is locked until Alice's main transaction is broadcast.

The locking-output with the main transaction, therefore, functions as a trigger because it adds an additional output to a transaction which is allocated to an input of the refund or reward mechanism, said reward mechanism requiring the signatures of both parties in advance of the broadcast. When the locking-output is broadcast as part of a transaction $T_x$ the conditions of the reward mechanism are satisfied i.e. both the resource x and locking-output d are present on the blockchain and are available as inputs.

The process S100 in FIG. 6 expands upon the simplest one-way exchange of transactions by demonstrating further features, in detail, using a mutually beneficial exchange. It begins with Alice and Bob creating S110 two new private-public key pairs. The public keys are, respectively, $\{P_A^1, P_A^2\}$ and $\{P_B^1, P_B^2\}$, while the corresponding private keys, respectively $\{S_A^1, S_A^2\}$ and $\{S_B^1, S_B^2\}$, are kept secret. The public keys are exchanged through a secure channel to create S120 four multi-signature addresses using the public keys as follows:

$$Add_{AB}^1 = \alpha_A = 2-2(P_A^1, P_B^1)$$

$$Add_{AB}^2 = \beta_A = 2-2(P_A^2, P_B^2)$$

$$Add_{BA}^1 = \alpha_B = 2-2(P_B^1, P_A^1,)$$

$$Add_{BA}^2 = \beta_B = 2-2(P_B^2, P_A^2)$$

Creating S130 the deposit transaction $D_x$ involves Alice and Bob committing an amount x of Bitcoin (e.g. BTC) that is locked under $\alpha_A$ and $\alpha_B$, respectively. Or, after the period of time T1 has lapsed the output can be redeemed via a $P_A^1$-based or $P_B^1$-based address. Bob and Alice collaborate to add their input and sign the scripts of the deposit transaction $D_x$. The blockchain is examined S140 to verify whether the transaction was broadcast and confirmed. If not, the process ends.

If the deposit transaction $D_x$ is broadcast, the main transactions of Alice and Bob—$T_x^A$ and $T_x^B$, respectively—are altered S150. Before the main transactions $T_x^A$, $T_x^B$ are exchanged for broadcast, Alice and Bob agree on an additional output, or locking-output, that is included in the transaction. The locking-output functions to trigger, unlock or release the output of the subsequently published refund mechanism—the trigger is a condition being met, which is that the resource and locking-output are both available as inputs. It is important that when the refund mechanism is broadcast that both inputs are available otherwise a miner will see that the inputs are not available and not add the transaction to a block for adding to the blockchain.

The locking-output is some dust d of BTC i.e. a few Satoshis that is locked under a pay-to-script-hash (P2SH)—having destination addresses $Add_{AB}^2$ ($\beta_A$) and $Add_{BA}^2$ ($\beta_B$) thus requiring both Alice and Bob's private keys to unlock the input to the refund mechanism.

A check S160 is made to determine if the main transactions are signed and exchanged. If not, and a time T1 has elapsed then Alice and Bob get their deposit back.

If the main transactions are signed and exchanged then the refund transactions are created S170. Using Alice's refund as an example, her refund transaction $R_x^A$ has, as inputs, the UTXO sent to the address $Add_{AB}^1$ ($\alpha_A$) in the deposit transaction $D_x$ and the UTXO of the dust sent to the address $Add_{BA}^2$ ($\beta_B$) in the main transaction $T_x^B$ generated by Bob. The output is sent to another address, namely $\gamma_A$. Bob does the same.

A check S180 is made and if both refund transactions are not signed before the time T1 has elapsed then Alice and Bob get their deposit back.

If both refund transactions are signed then compensation transactions are created S190. These are time-locked, and if the main transactions are not broadcast and a time T2 has elapsed then the resource held in the deposit account and secured by $\text{Add}_{AB}^1$ and $\text{Add}_{BA}^1$ is output to another address of Alice and Bob, respectively $\pi_A$ and $\pi_B$.

A check S200 is made and if both compensation transactions are not signed and broadcast before the time T1 has elapsed then Alice and Bob get their deposit back.

If both compensation transactions are signed and broadcast then Alice and Bob broadcast S210 the main transactions $T_x^A$, $T_x^B$. When their broadcast is confirmed, Alice and Bob broadcast S220 their refund mechanisms.

A check S230 confirms whether the main transactions are broadcast and if one or both are not broadcast before a time T2 has elapsed then the compensation transactions or mechanisms function to allocate resource held in the deposit account and secured by $\text{Add}_{AB}^1$ and $\text{Add}_{BA}^1$ to another address of Alice and Bob, respectively $\pi_A$ and $\pi_B$.

FIG. 8 simplifies the process of FIG. 6 into phases to highlight the order or phases in which transactions are exchanged and/or signed for the given example.

The first phase involves the preparation and subsequent broadcast of the deposit transaction $D_x$ on blockchain network by Alice or Bob, which ends phase one.

The second phase involves the preparation and exchange of the main transactions $T_x^A$, $T_x^B$, the creation and signing of the refund mechanisms $R_x^A$, $R_x^B$ and the creation and signing of the compensation transactions of Alice and Bob—$C_x^A$ and $C_x^B$. Phase two ends with the broadcast of the compensation transactions.

The third phase is the broadcast of the signed main transactions $T_x^A$, $T_x^B$.

In the fourth phase, the period before T2, Alice and Bob confirm that main transactions $T_x^A$, $T_x^B$ are broadcast and, when broadcast is confirmed, they subsequently broadcast their refund mechanisms $R_x^A$, $R_x^B$.

In the fifth phase, between the period T2 and T1, a check is made to ensure that the main transactions $T_x^A$, $T_x^B$ are broadcast in time and if not, that party whose transaction has not broadcast can spend the UTXO in their compensation transaction.

The sixth phase ensures that if actions are not taken before time T1 has elapsed then Alice and Bob are able to access their UTXO placed in the deposit transaction $D_x$.

Applications

It has been stressed above that the method is suitable for allowing conditional secure access to financial and non-financial resources. Various scenarios can be envisaged, in which the main transaction and/or resource of the deposit are used to exchange information. These transactions can contain data, or metadata, which can be embedded with a script or in an output return script.

Access to a non-financial resource can be provided via, for example an additional output incorporated into the deposit mechanism that provides an encrypted link to a document in exchange for the completion of the task. The additional output could be released or made available for access by the output from the locking mechanism e.g. the access to the additional output could be secured by the hash of the data associated with the date and time of the addition of the block, in which the locking mechanism is recorded, was added to the blockchain. When the task is complete, and the locking mechanism is broadcast, the date and time at which it was added to the blockchain as part of a block will be known. The script of the deposit mechanism can be written to secure the additional output until the locking mechanism is broadcast.

The invention has been illustrated and described, by way of example, in FIGS. 6 to 8. The invention, however, is not limited thereto. The broadcast of a deposit transaction and subsequent preparation of the main transaction and refund transaction, followed by the sequential broadcast of the main transaction in exchange for access to a resource via the refund transaction, is core to the invention. In the examples, the transactions T have two outputs, and the second output—the dust—is used as a second input to the locking mechanism. While the 'dust' can be used to lock access to a resource, such an output can alternatively be a large sum of cryptocurrency and constitute a payment e.g. a payment for access to a resource, such as a movie. Moreover, the example provided suggests that the exchanges between two parties are of comparable size but in light of the teaching herein the output of the deposit mechanism and/or the transactions could be different between the two parties.

Non-financial applications may include, by way of example:

A consumer wishes to purchase a digital download of a movie, and agrees with a distributor to make a payment in exchange for an access code that enables a one-time download. The code can be secured in the script of the deposit transaction and the consumer can be provided with a transaction to broadcast, said transaction broadcast including a payment to the distributor. When the transaction is broadcast the code is made available to the consumer.

A software developer working on sequential stages of a confidential project is required to complete a piece of work, or stage, before being given access to data on a subsequent stage. By way of example, a code indicating that the work-output or compiled program from a stage is complete can be incorporated into a transaction for broadcast, which that proves its completion and becomes a condition which, when met, releases data to enable the programmer to work on another stage.

An independent programmer and a client requiring a program to perform a specific function agree on program to be written. One of the transactions $T_x A$ and $T_x B$ could contain the invoice/receipt for the work and the other one the payment to the worker. A deposit made by the client could protect the programmer for initial hardware investments upfront while a deposit made by the programmer could be a commitment to finish a project on time. The transactions would be signed and sent to the network after completion of the work.

SUMMARY

The method enables conditional access to resource. The condition is the performance of a task. The task can be performed by one party or entity on behalf of another party or entity. The person or system controlling access to the resource creates a task that includes the broadcast of a transaction on the blockchain. In particular the transaction (part of the task) has a plurality of outputs, including a locking-output.

Additional transactions or mechanism are created that enable access to the resource only when the task has been completed. Access to the resource is achieved by (i) the initial broadcast of the resource (which is an amount of cryptocurrency in the example provided, but could equally be an access code) that makes it conditionally available and (ii) the subsequent broadcast of the transaction, which fulfils or satisfies the condition that enables access to the resource. The staged broadcasts provide for performance-based access. Moreover, the creation of a transaction by one party for the broadcast by another party obfuscates or obscures the source of the transaction to improve security.

Multi-signatures and a locking or refund mechanism are used by the parties to lock access to the resource. The initial deposit broadcast makes the resource conditionally available, but access is prohibited because it is locked by the refund mechanism. The task, and transaction to be broadcast, are created wherein the transaction has a locking-output secured by a second multi-signature and also locked by the refund mechanism. Access to the resource, however, requires both multi-signature addresses of the refund mechanism to have been signed in advance of the broadcast of the refund mechanism and that it is broadcast after the broadcast of the main transaction. The locking, refund or reward mechanism is created to secure the resource until the transaction is broadcast. With both the deposit broadcast and the transaction broadcast providing inputs to the refund mechanism the conditions of the refund or reward mechanism are met and the resource can be accessed by the party who has completed the task i.e. the party who has broadcast the transaction.

REFERENCES

1. Dandelion
Venkatakrishnan, S. B., Fanti, G. and Viswanath, P., 2017.
Dandelion: Redesigning the Bitcoin Network for Anonymity.
arXiv preprint arXiv: 1701.04439.
https://arxiv.org/pdf/1701.04439.pdf
2. De-anonymisation Biryukov, A., Khovratovich, D., & Pustogarov, I. (2014, November).
Deanonymisation of clients in Bitcoin P2P network.
In Proceedings of the 2014 ACM SIGSAC Conference on Computer and Communications Security (pp. 15-29). ACM.
https://arxiv.org/pdf/1405.7418.pdf
3. Tor
Dingledine, R., Mathewson, N., & Syverson, P. (2004).
Tor: The second-generation onion router.
Naval Research Lab Washington DC
A Bitcoin Developer Reference is retrievable from http.//bitcoin.org/en/developer-reference.

The invention claimed is:

1. A computer-implemented method for controlling access to a resource performed by a first party (A) computer system having a first memory and processor, said access being conditional upon a task being performed by a second party (B) computer system having a second memory and processor, wherein the task includes broadcasting a transaction ($Tx^A$) on a blockchain, the method including:
- collaborating, by the first party (A) computer system, with the second party (B) computer system to create a first multi-signature address ($\alpha_B$) and second multi-signature address ($\beta_A$);
- broadcasting, by the first party (A) computer system, a deposit mechanism ($D_x$) that allocates a resource (x) to the first multi-signature address ($\alpha_B$);
- building, by the first party (A) computer system, a task, said task including the broadcast of a transaction ($T_x^A$), and sending said task to the second party (B) computer system for broadcast on the blockchain, said transaction having a locking-output (d) allocated to the second multi-signature address ($\beta_A$);
- creating and sending, by the first party (A) computer system, a locking mechanism ($R_x^B$) to the second party (B) computer system, or receiving a locking mechanism ($R_x^B$) from the second party (B) computer system, wherein an input to said locking mechanism is the resource (x) and the locking-output (d), which are locked by their respective multi-signatures, and an output (d+x) is the resource and the locking-output;
- signing, by the first party (A) computer system, the first multi-signature address ($\alpha_B$) and second multi-signature address ($\beta_A$), enabling the second party (B) computer system to sign the first multi-signature address ($\alpha_B$) and second multi-signature address ($\beta_A$), thus unlocking the input to the locking mechanism ($R_x^B$) enabling the output (d+x) to be allocated to an address ($\gamma_B$) accessible by the second party (B) computer system, wherein said output is conditional upon both the resource and the locking-output being allocated to their multi-signature addresses on the blockchain;
- confirming, by the first party (A) computer system, the broadcast of the transaction ($T_x^A$); and
- in response to confirming the broadcast of the transaction ($T_x^A$), broadcasting, by the first party (A) computer system, the locking mechanism ($R_x^B$) on the blockchain causing allocation of the locking-output (d) to the second multi-signature address ($\beta_A$) and enabling the second party (B) computer system to access the resource and the locking-output (d+x).

2. The computer-implemented method according to claim 1, wherein:
   i) the broadcast of the deposit mechanism precedes the broadcast of the transaction and/or locking mechanism; and
   ii) the transaction ($T_x^A$) further comprises a transaction output (m).

3. The computer-implemented method according to claim 1,
wherein the deposit mechanism ($D_x$) allocates the resource (x) to the input of the locking mechanism ($R_x^B$) and the transaction allocates the locking-output (d) to the input of the locking mechanism,
wherein the first party (A) computer system and second party (B) computer system sign, using their private keys, the first multi-signature address and second multi-signature address of the locking mechanism in advance of the transaction broadcast,
such that when the transaction ($T_x^A$) is broadcast, and the locking-output (d) is assigned to the second multi-signature, the locking mechanism ($R_x^B$) is able to allocate the resource and the locking-output (d) to an output of the locking mechanism ($R_x^B$), which is an address ($\gamma_B$) accessible by the second party (B) computer system.

4. The computer-implemented method according to claim 1, wherein the first party (A) computer system broadcasts the locking mechanism.

5. The computer-implemented method according to claim 1, wherein the access to the resource has stages, said stages including:
- a first stage wherein the broadcast of the deposit mechanism ($D_x$) allocates the resource (x) to the first multi-signature address ($\alpha_B$); and
- a second stage wherein the broadcast of the transaction ($T_x^A$) allocates a locking-output (d) to the second multi-signature address ($\beta_A$), wherein the completion of the first and second stage satisfy a condition that a task has been completed such that the subsequently broadcast locking mechanism ($R_x^B$) receives the resource and locking-output as an input and allocates the resource and locking-output to an address accessible ($\gamma_B$) to the second party (B) computer system in exchange for the completion of the task.

6. The computer-implemented method according to claim 1, wherein the second party (B) computer system provides secure task-based access to a second resource, said access being conditional upon a second task being performed by the first party (A) computer system, wherein the second task includes broadcasting a second transaction ($T_x^B$) by the first party (A) computer system on a blockchain in exchange for access to the second resource, the method further including:
   in addition to the first party (A) computer system collaborating with the second party (B) computer system to create the first multi-signature address ($\alpha_B$) and the second multi-signature address ($\beta_A$), the second party (B) computer system collaborates with the first party (A) computer system to create a third multi-signature ($\alpha_A$) and a fourth multi-signature address ($\beta_B$);
   the broadcast of the deposit mechanism ($D_x$) further including the second party (B) computer system allocating the second resource to the third multi-signature address ($\alpha_A$);
   the second party (B) computer system building a second task, said second task including the broadcast of a second transaction ($T_x^B$), and sending said task to the first party (A) computer system for broadcast on the blockchain, said transaction having:
      a second transaction output (p), and
      a second locking-output (d) allocated to a fourth multi-signature address ($\beta_B$); and
   the second party (B) computer system creating and sending a second locking mechanism ($R_x^A$) to the first party (A) computer system, or receiving a second locking mechanism ($R_x^A$) from the first party (A) computer system, wherein an input to said second locking mechanism is the second resource (x) and the second locking-output (d), which are locked by their multi-signatures, and an output from said second locking mechanism is the second resource and the second locking-output, wherein the second party (B) computer system signs the third multi-signature address ($\alpha_A$) and fourth multi-signature ($\beta_B$), enabling the first party (A) computer system to sign the third multi-signature address ($\alpha_A$) and fourth multi-signature address ($\beta_B$), thus unlocking the input to the second locking mechanism ($R_x^A$) enabling the output to be allocated to an address accessible by the first party (A) computer system, wherein said output is conditional upon the second resource and the second locking-output being allocated to their multi-signature addresses on the blockchain, wherein upon confirmation of the transaction ($T_x^B$) being broadcast, the locking mechanism ($R_x^A$) is broadcast on the blockchain thus allocating the second locking-output to the fourth multi-signature address ($\beta_B$) and enabling the first party (A) computer system to access the second resource and the second locking-output.

7. The computer-implemented method according to claim 1, wherein the output of a locking mechanism ($R_x$) is allocated to a reward address ($\gamma$) accessible by a computer system of a party who has completed a task.

8. The computer-implemented method according to claim 6, wherein:
   the first party (A) computer system broadcasts a deposit mechanism ($D_x$) that allocates a resource (x) to the first multi-signature address ($\alpha_B$), and
   the broadcast of the deposit mechanism ($D_x$) further including the second party (B) computer system allocating the second resource to the third multi-signature address ($\alpha_A$),
   such that access to the resource and second resource is provided by a computer system of one party for a computer system of another party in exchange for completion of a task.

9. The computer-implemented method according to claim 6, wherein:
   the first party (A) computer system broadcasts a deposit mechanism ($D_x$) that allocates a resource (x) to the third multi-signature address ($\alpha_A$), and
   the broadcast of the deposit mechanism ($D_x$) further including the second party (B) computer system allocating the second resource to the first multi-signature address ($\alpha_B$),
such that access to the resource and second resource is retained by a party computer system when said party computer system completes a task assigned by another party computer system.

10. The computer-implemented method according to claim 9, the method further including:
   creating a first compensation mechanism ($C_x^A$) that enables the first party (A) computer system to allocate the second resource (x) allocated to the deposit mechanism ($D_x$) by the second party (B) computer system to a compensation address ($\pi_A$) accessible by the first party (A) computer system, when
   (i) the first party (A) computer system has broadcast the transaction of the second party (B) computer system, and
   (ii) the second party (B) computer system fails to broadcast the transaction of the first party (A) computer system within a second predetermined period of time (T2) following the first party (A) computer system sending a transaction to the second party (B) computer system; and/or
   creating a second compensation mechanism ($C_x^B$) that enables the second party (B) computer system to allocate the resource (x) allocated to the deposit mechanism ($D_x$) by the first party (A) computer system to a compensation address ($\pi_B$) accessible by the second party (B) computer system, when
   (iii) the second party (B) computer system has broadcast the transaction of the first party (A) computer system, and
   (iv) the first party (A) computer system fails to broadcast the transaction of the second party (B) computer system within a second predetermined period of time (T2) following the second party (B) computer system sending a transaction to the first party (A) computer system.

11. The computer-implemented method according to claim 6, wherein:
   the second party (B) computer system accesses or reassigns the second resource if the first party (A) computer system fails to sign and exchange their transaction for broadcast within a first predetermined period of time (T1) following the second party (B) computer system sending a transaction to the first party, and/or
the first party (A) computer system accesses or reassigns the resource if the second party (B) computer system fails to sign and exchange their transaction within a first predetermined period of time (T1) following the first party (A) computer system sending a transaction to the second party (B) computer system.

12. A computer-readable storage medium comprising computer-executable instructions that, when executed by a first party (A) computer system having a first memory and first processor, configure the first processor to perform a method including:

collaborating with a second party (B) computer system, having a second memory and second processor, to create a first multi-signature address ($\alpha_B$) and second multi-signature address ($\beta_A$);

broadcasting a deposit mechanism ($D_x$) that allocates a resource (x) to the first multi-signature address ($\alpha_B$);

building a task, said task including the broadcast of a transaction ($T_x^A$), and sending said task to the second party (B) computer system for broadcast on the blockchain, said transaction having a locking-output (d) allocated to the second multi-signature address ($\beta_A$);

creating and sending a locking mechanism ($R_x^B$) to the second party (B) computer system, or receiving a locking mechanism ($R_x^B$) from the second party (B) computer system, wherein an input to said locking mechanism is the resource (x) and the locking-output (d), which are locked by their respective multi-signatures, and an output (d+x) is the resource and the locking-output;

signing the first multi-signature address ($\alpha_B$) and second multi-signature address ($\beta_A$), enabling the second party (B) computer system to sign the first multi-signature address ($\alpha B$) and second multi-signature address ($\beta A$), thus unlocking the input to the locking mechanism ($R_x^B$) enabling the output (d+x) to be allocated to an address ($\gamma_B$) accessible by the second party (B) computer system, wherein said output is conditional upon both the resource and the locking-output being allocated to their multi-signature addresses on the blockchain;

confirming, by the first party (A) computer system, the broadcast of the transaction ($T_x^A$); and in response to confirming the broadcast of the transaction (TxA), broadcasting, by the first party (A) computer system the locking mechanism ($R_x^B$) on the blockchain causing allocation of the locking-output (d) to the second multi-signature address ($\beta_A$) and enabling the second party (B) computer system to access the resource and the locking-output (d+x).

13. A first party (A) device comprising:

an interface device;

one or more first processor(s) coupled to the interface device; and a first memory coupled to the one or more processor(s), the first memory having stored thereon computer executable instructions that, when executed, configure the one or more first processor(s) to perform a method including:

collaborating with a second party (B) device having one or more second processor(s) and a second memory, to create a first multi-signature address ($\alpha_B$) and second multi-signature address ($\beta_A$);

broadcasting a deposit mechanism ($D_x$) that allocates a resource (x) to the first multi-signature address ($\alpha_B$);

building a task, said task including the broadcast of a transaction ($T_x^A$), and sending said task to the second party (B) device for broadcast on the blockchain, said transaction having a locking-output (d) allocated to the second multi-signature address ($\beta_A$);

creating and sending a locking mechanism ($R_x^B$) to the second party (B) device, or receiving a locking mechanism ($R_x^B$) from the second party (B) device, wherein an input to said locking mechanism is the resource (x) and the locking-output (d), which are locked by their respective multi-signatures, and an output (d+x) is the resource and the locking-output;

signing the first multi-signature address ($\alpha_B$) and second multi-signature address ($\beta_A$), enabling the second party (B) device to sign the first multi-signature address ($\alpha_B$) and second multi-signature address ($\beta_A$), thus unlocking the input to the locking mechanism ($R_x^B$) enabling the output (d+x) to be allocated to an address ($\gamma_B$) accessible by the second party (B) device, wherein said output is conditional upon both the resource and the locking-output being allocated to their multi-signature addresses on the blockchain;

confirming, by the first party (A) device, the broadcast of the transaction (TxA); and in response to confirming the broadcast of the transaction ($T_x^A$, broadcasting, by the first party (A) device, the locking mechanism ($R_x^B$) on the blockchain, causing allocation of the locking-output (d) to the second multi-signature address ($\beta_A$) and enabling the second party (B) device to access the resource and the locking-output (d+x).

\* \* \* \* \*